United States Patent [19]
Genton

[11] 3,898,067
[45] Aug. 5, 1975

[54] CONCENTRIC CLOTH-TUBE AIR FILTER AND DUST COLLECTOR

[75] Inventor: Richard G. Genton, West Covina, Calif.

[73] Assignee: Industrial Clean Air, Inc., Berkeley, Calif.

[22] Filed: Oct. 4, 1973

[21] Appl. No.: 403,632

[52] U.S. Cl. .................. 55/341; 55/378; 55/379; 55/380; 55/496; 55/498; 55/508; 55/511
[51] Int. Cl. ............................................ B01d 46/02
[58] Field of Search ............. 55/341, 378, 380, 508, 55/511, 323, 324, 379, 492, 496, 498

[56] References Cited
UNITED STATES PATENTS

| 1,324,635 | 12/1919 | Ascoli | 55/341 X |
|---|---|---|---|
| 2,014,298 | 9/1935 | Schneible | 55/341 X |
| 3,396,516 | 8/1968 | Ballard | 55/341 X |
| 3,431,709 | 3/1969 | Kawanami | 55/302 |
| 3,710,552 | 1/1973 | Genton | 55/341 X |
| 3,859,065 | 1/1975 | Schoeck | 55/378 |

Primary Examiner—Frank W. Lutter
Assistant Examiner—Kathleen J. Prunner
Attorney, Agent, or Firm—Phillips, Moore, Weissenberger, Lempio & Strabala

[57] ABSTRACT

A dry air filter and dust collector for use in industrial bag houses having two vertical cloth tubes coaxially arranged one within the other, the tubes being independently tensioned. Dirty air is introduced into the annulus between the tubes and flows outwardly through the outer tube and inwardly through the inner tube, trapping the dust in the annulus. The tubes may be cleaned by shaking or reversal of air flow.

5 Claims, 3 Drawing Figures

PATENTED AUG 5 1975
3,898,067
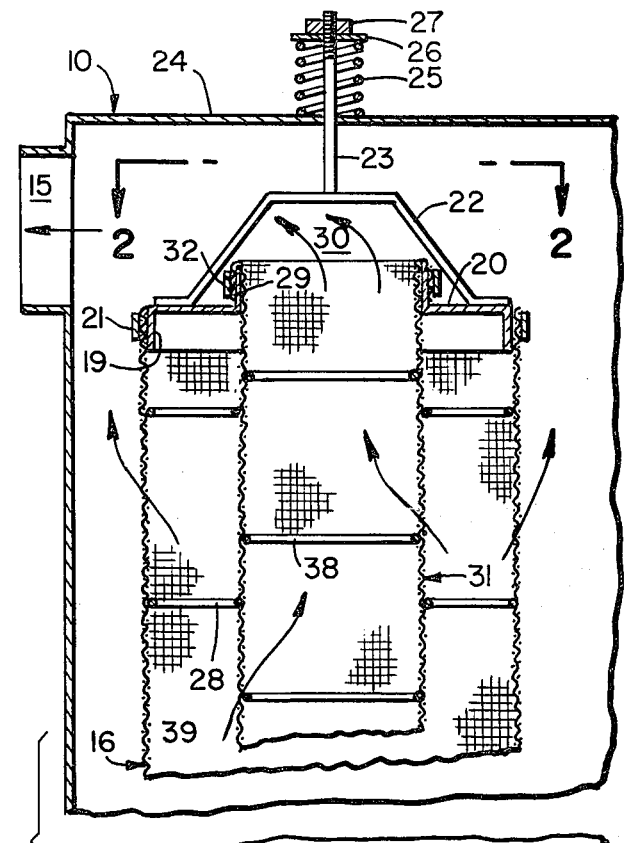
FIG_1
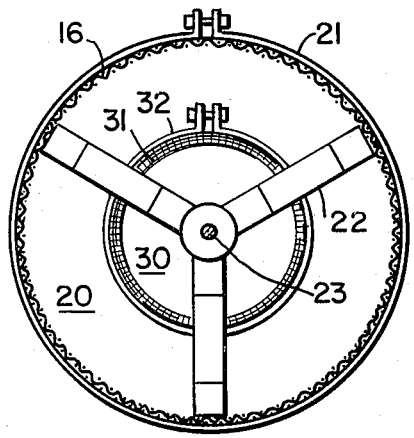
FIG_2
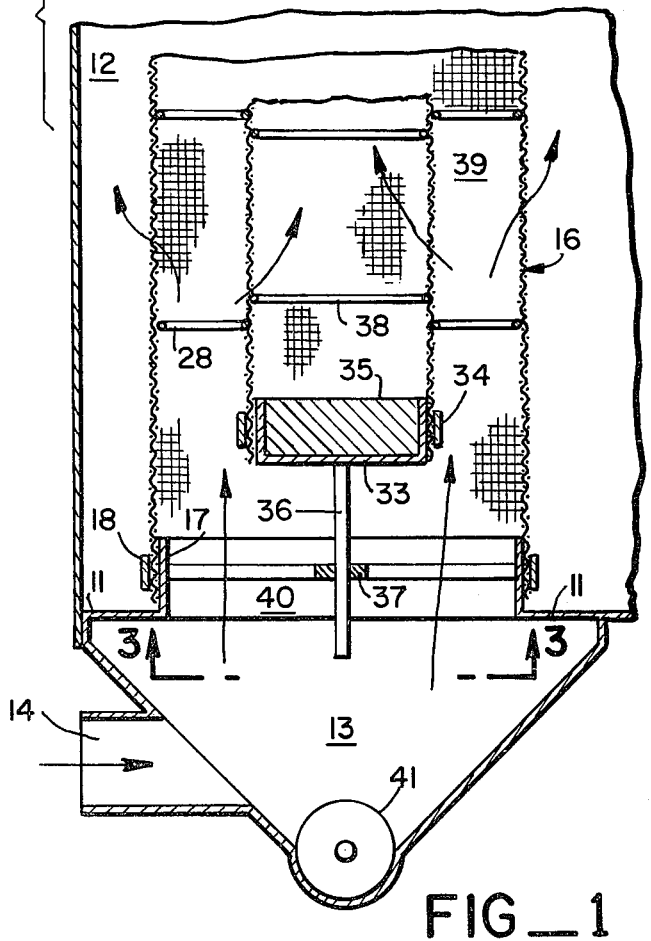
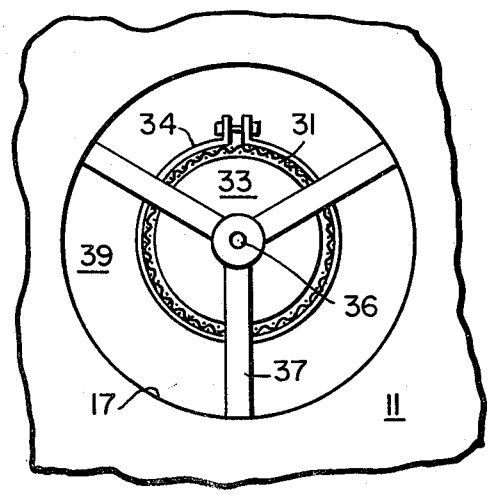
FIG_3

CONCENTRIC CLOTH-TUBE AIR FILTER AND DUST COLLECTOR

BACKGROUND OF THE INVENTION

This invention relates to industrial dry air cleaners of the type shown in my prior U.S. Pat. No. 3,710,552, wherein dirty air enters a bag house, passes through the cloth-tube filters suspended in the bag house, trapping the dirt, dust or other particulate matter on the interiors of the tubes. The clean air passes through the tubes and then exits from the bag house.

The amount of dirty air which can be handled by such air cleaners is directly proportional to the total surface area of the fabric of the tubes through which the air passes. To increase the capacity, the surface area of the tubes must be increased. Typically, this is accomplished by making the tubes longer, or larger in diameter, or by increasing the number of tubes in the bag house. The capacity of the system can thus be increased, but at the same time the bag house must be correspondingly increased in size, which makes for a costly solution to the problem.

SUMMARY OF THE INVENTION

The main object of the present invention is to provide a substantial increase in the capacity, e.g., in the order of 150 percent, of a cloth-tube air-cleaning system without an increase in size of the bag house and without major modification of existing bag houses.

In general, this object is achieved by disposing a smaller-diameter cloth-tube filter within a larger-diameter cloth-tube filter to provide an annular space therebetween. The dirty air passes into the annular space and filters out through the outer tube and in through the inner tube, trapping the dust in the annular space therebetween.

By such arrangement, the outer tubes will handle as much air and will require no more bag-house space than in a conventional arrangement using the same-size tubes. The inner tubes require no additional bag house and will add approximately half again as much filter area.

The inner and outer tubes are independently tensioned and arranged so that the annular space is maintained during normal operation or during tube-cleaning operations so that the life of the tubes is not adversely affected.

Other objects and advantages will become apparent in the course of the following detailed description.

BRIEF DESCRIPTION OF THE DRAWINGS

In the drawings forming a part of this application, and in which like parts are designated by like reference numerals throughout the same, FIG. 1 is a vertical sectional view through one end of a bag house and through one set of the concentric cloth-tube filters;

FIG. 2 is a view looking downwardly on the top of the concentric tubes, as seen from line 2—2 of FIG. 1;

FIG. 3 is a view looking upwardly at the buttom of the concentric tubes, as seen from line 3-3 of FIG. 1;

DESCRIPTION OF THE PREFERRED EMBODIMENT

Referring now to the drawings wherein a preferred embodiment of the invention is shown, the bag house 10 has a horizontal partition 11 therein which divides the interior of the bag house into upper and lower chambers 12 and 13. The lower chamber 13 has an inlet 14 thereinto through which dirty air enters the bag house. An outlet opening 15 at the top of the bag house allows clean air to flow therefrom. A conventional blower (not shown) is used to induce air flow through the bag house.

An elongated cloth-tube filter 16 is mounted in chamber 12, the lower end of the tube being secured around thimble 17 and held in place thereon by retainer ring 18. Thimble 17 is a flange integral with and upstanding from partition 11. The upper end of tube 16 is secured to the depending flange 19 of end cap 20 by retainer ring 21. Cap 20 has an upwardly extending spider 22 secured thereto, the latter having a vertically extending rod 23 on the upper end which may project up through the upper wall 24 of the bag house, through the compression spring 25 and plate 26 and the nut 27 which is threaded thereon. Threading the nut 27 upwardly or downwardly on rod 23 will enable the tension on tube 16 to be adjusted to that which is desired. Tube 16 has a plurality of stiffening rings 28 secured thereto at spaced intervals therealong to provide support to the tube and prevent undue inward collapse of the tube when subjected to a reverse air circulation in a tube-cleaning operation.

The cap 20, which is otherwise imperforate, has an upstanding flange 29 surrounding the central opening 30 through the cap. An inner cloth-tube filter 31 has its upper end extending up through the cap opening 30 and doubled back over flange 29, the tube being secured to the cap flange 29 by retainer ring 32. The lower end of tube 31 is closed by imperforate end cap 33 to which the tube is secured by retainer ring 34. A weight 35 is carried in end cap 33, the weight having sufficient mass to hold tube 31 under the desired amount of tension. A vertical guide rod 36 extends downwardly from end cap 33 and passes through the central opening in spider 37 which is secured to thimble 17. Guide rod 36 is free to move vertically relative to spider 37 but is constrained thereby against horizontal movement. Tube 31 has a plurality of stiffening rings 38 secured thereto at spaced intervals therealong to support the tube against inward collapse when the interior thereof is maintained at a pressure sufficiently less than the pressure in the annulus 39 between the tubes to induce the desired rate of flow of air through tube 31 into the interior thereof.

The thimble 17 on partition 11 surrounds the partition opening 40 so that the annulus 39 between tubes 16 and 31 is in free communication with the lower chamber 13.

Preferably the bottom walls of the lower chamber 13 slant downwardly and converge towards screw conveyor 41 which is used periodically to remove accumulated dust from chamber 13.

Although only one set of concentric tubes is shown, it is to be understood that there will be a plurality of such sets of tubes in bag house 10, parallel with each other, and that a lower chamber 13 and inlet 14 is associated with each set of tubes so that dirty air will enter the annulus in each tube set and be filtered by the tubes.

In operation, a suction system will be connected to the outlet opening 15 of the bag house, and will draw dirty air into the lower chamber 13 through inlet opening 14. The dirty air with entrained particulate matter flows freely up through partition opening 40 into the annulus 39 between tubes 16 and 31. The air flows outwardly through the outer tube 16 and inwardly through the inner tube 31, with the particulate matter being trapped in the annulus on the inner surface of tube 16 and the outer surface of tube 31. The clean air in tube 31 passes freely upwardly through the cap opening 30 and then flows through the outlet 15 along with the clean air which passed outwardly through tube 16.

From time to time it becomes necessary to clean the accumulated dust or other particulate matter from tubes 16 and 31. This may be done in a conventional manner by physical shaking, or by reversing the flow of air in the system so that the air flows into tube 16 and out of tube 31. The dislodged matter falls freely through the annulus 39 and opening 40 into the lower chamber 13 where it accumulates on screw conveyor 41 for removal thereby.

The diameter of the inner tube 31 should be as large as possible, so as to provide the maximum surface area available for filtering. However, at the same time, the inner tube should be sufficiently smaller in diameter than the outer tube so as not to impede flow of dirty air into annulus 39 and so as to avoid any possibility of contact between the tubes during air-cleaning operations or tube-cleaning operations, since such contact will cause the life of the tubes to be materially shortened.

The mounting arrangement, wherein each sleeve is independently tensioned and wherein the sleeves are maintained out of contact with each other at all times, enables the tubes to be made from all cloth materials used for such purposes, including cloth made from teflon and glass fibers, the latter two being particularly susceptible to failure from abrasion.

Having thus described my invention, I claim:

1. An air filter and dust collector comprising:
   a. an enclosed bag house having a horizontal partition therein dividing the interior of said bag house into upper and lower chambers, said bag house having an inlet for dirty air into said lower chamber and an outlet for clean air from said upper chamber, said partition having an opening therethrough,
   b. a first cloth tube vertically disposed in said upper chamber, said tube having its lower end fixedly secured to said partition with the interior of said tube being in free communication with said lower chamber through said partition opening,
   c. an end cap fixedly secured to and closing the upper end of said first tube, said cap having a central opening therethrough,
   d. means for suspending said cap from said bag house and for adjusting the elevation of said cap above said partition to impart a desired tension to said first tube,
   e. a second cloth tube disposed in and spaced annularly from said first tube, said second tube having its upper end fixedly secured to said end cap, said second tube being suspended from said end cap with the interior of said second tube being in free communication with said upper chamber through said cap opening,
   f. means closing off the bottom end of said second tube,
   g. means for imparting a predetermined downward force of constant value on the bottom end of said second tube to impart a desired amount of tension to said second tube,
   h. means for centering the bottom end of said tube relative to said second tube, and for enabling said bottom end of said second tube to move freely up and down whereby a change in elevation of said end cap above said partition will produce a corresponding change in elevation of said bottom end of said second tube without producing a change in the amount of tension imparted to said second tube.

2. Apparatus as set forth in claim 1 and further including stiffening rings secured to said second tube at spaced points therealong.

3. Apparatus as set forth in claim 1 wherein said means (h) comprises a vertical guide rod secured to said means for closing off the bottom end of said second tube and extending downwardly therefrom, and means secured to said partition for holding said guide rod against horizontal movement while allowing unrestricted vertical movement of said guide rod.

4. Apparatus as set forth in claim 3 and further including stiffening rings secured to said second tube at spaced points therealong.

5. Apparatus as set forth in claim 3 and further including stiffening rings secured to both said first and second tubes at spaced points therealong.

* * * * *